United States Patent [19]

Dornan

[11] 4,129,047

[45] Dec. 12, 1978

[54] CONTROL ARRANGEMENT

[75] Inventor: Arthur E. Dornan, Ypsilanti, Mich.

[73] Assignee: Massey-Ferguson Inc., Detroit, Mich.

[21] Appl. No.: 811,229

[22] Filed: Jun. 29, 1977

[51] Int. Cl.² .................. B60K 20/00; G05G 5/10
[52] U.S. Cl. ............................. 74/474; 74/477; 74/478; 192/0.098
[58] Field of Search ............... 74/474, 477, 513, 478; 192/0.096, 0.098

[56] References Cited

U.S. PATENT DOCUMENTS

| 3,313,174 | 4/1967 | Walker et al. | 74/474 |
| 3,525,266 | 9/1970 | Brooks et al. | 74/478 |
| 3,537,328 | 11/1970 | Allen | 74/474 |
| 3,858,675 | 1/1975 | Geis | 74/478 |
| 3,960,233 | 6/1976 | Aldred | 74/474 |
| 4,014,218 | 3/1977 | Brandt | 192/0.098 |

Primary Examiner—Samuel Scott
Assistant Examiner—James Yates
Attorney, Agent, or Firm—W. R. Nolte

[57] ABSTRACT

A foot pedal control arrangement for the transmission and throttle of a vehicle employing a pair of pedals movable independently of each other in an initial range to control the transmission of the vehicle and movable in a second range to control the throttle and engine speed of the vehicle.

10 Claims, 3 Drawing Figures

CONTROL ARRANGEMENT

This invention relates to foot pedal controls for the transmission and throttle of a vehicle which leaves the operator's hands free to manipulate other controls.

Foot pedal control mechanisms are available by which initial pedal movement of either of a pair of pedals engages the transmission into either its forward or rearward driving range and subsequent movement of the pedal operates the throttle to increase engine speed to cause movement of the vehicle. Also depression of both pedals operates the throttle to permit increased engine speed without engaging the transmission. Controls of this type are particularly useful for the operation of load-handling equipment, such as front loaders or the like, in which the vehicle is moved to a stationary position and maximum engine speed is used during loading after which the vehicle is again moved to the unloading point. Foot pedal controls of this type leave the hands free for steering and other control operations. However, there is a danger of engaging the transmission in either of its driving directions when the throttle is at its high speed range. This can cause overloading of the transmission or sudden unexpected directional movement of the vehicle resulting in possible danger and damage to persons and property.

It is an object of the invention to provide a control arrangement for controlling the transmission and throttle of a vehicle by selective or simultaneous use of a pair of pedals.

Another object of the invention is to provide a two pedal arrangement for controlling the shifting of a transmission and the operation of a throttle in any selected range of operation of the transmission, namely forward, reverse or a neutral.

Still another object of the invention is to provide a foot pedal control arrangement for controlling a transmission and throttle in which the pedals are so interconnected that when the transmission is engaged in either of its driving ranges the control pedal must be returned to a neutral position to make a change in the direction of transmission drive.

A pedal control for the transmission and throttle of a vehicle has been provided in which a pair of pedals are mounted for pivotal movement about a common axis and a transmission control lever is supported on one of the pedal levers and interconnected with the other pedal lever for pivotal movement in one direction when one pedal is moved and for pivotal movement in an opposite direction when the other pedal is moved. The transmission control lever is adapted to move a transmission in opposite directions from its neutral position to either a forward or reverse driving range, such movement being accomplished upon movement of either or both of the pedals in an initial range. After the transmission is engaged, the pedals move as a unit into a second range for controlling the throttle and engine speed. The control pedals are provided with a lock means which prevents changing the driving range of the transmission when either or both pedals are in the throttle control range movement to prevent accidental shifting of the transmission.

These and other objects of the invention will be apparent from the following description and the drawings in which.

Figure 1:
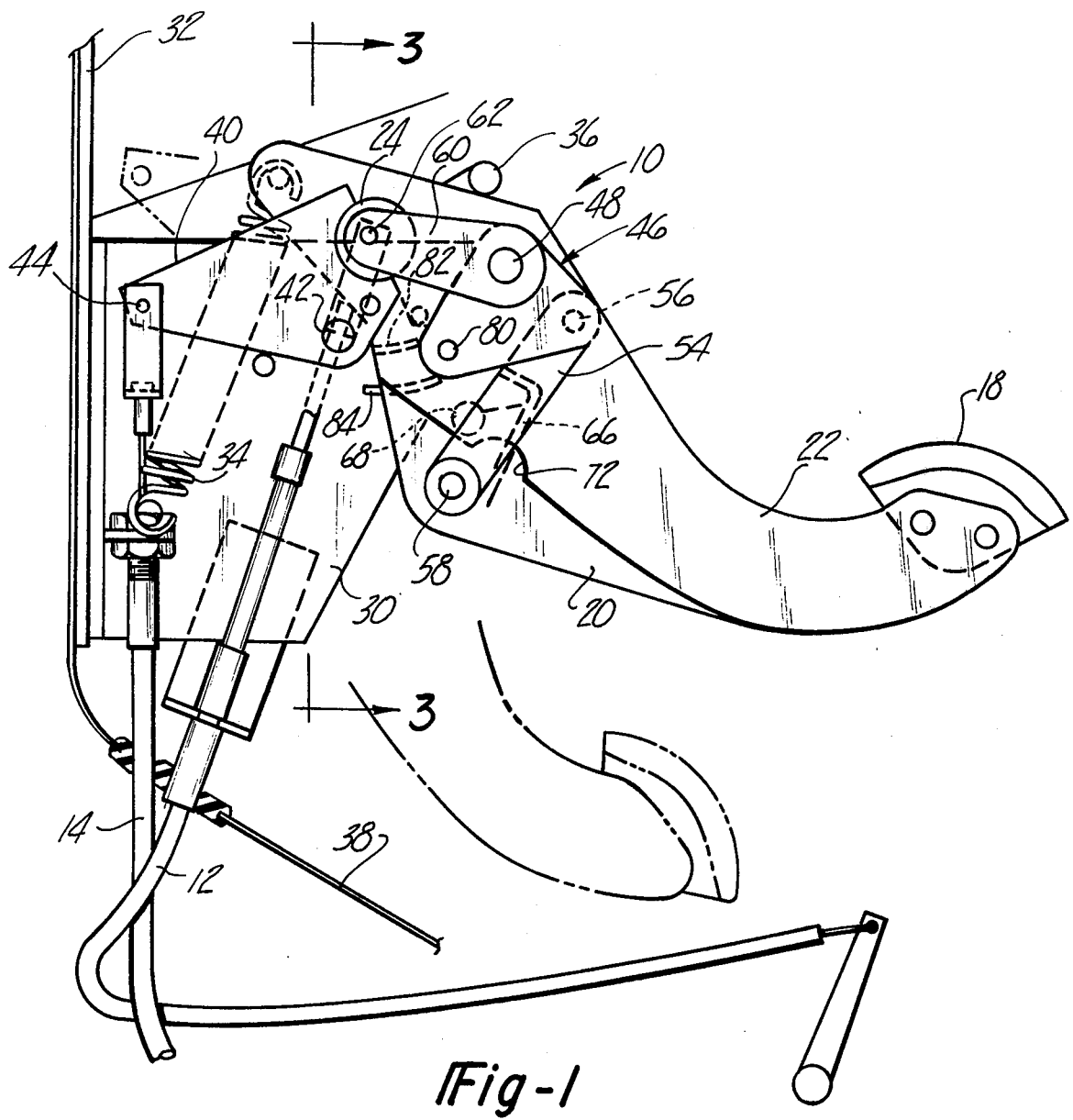
FIG. 1 is a side elevation of a control pedal arrangement.
Figure 2:
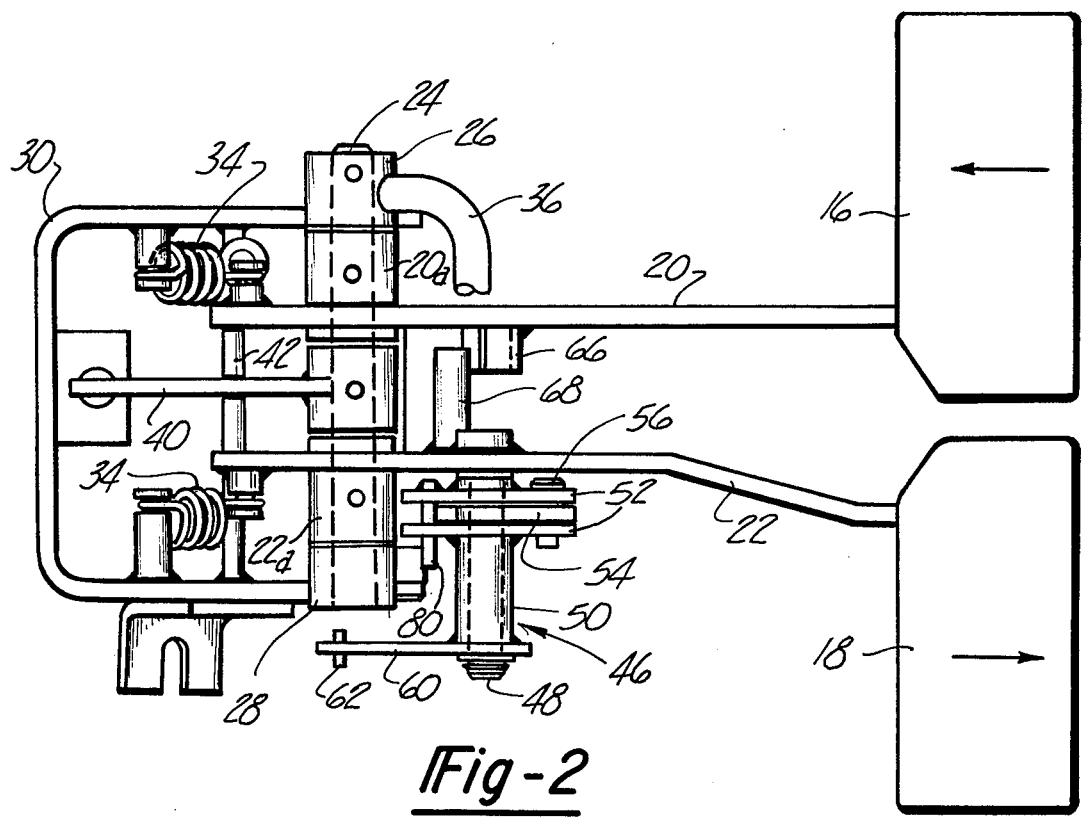
FIG. 2 is a top elevation of the control pedal arrangement seen in FIG. 1.

Referring to the drawings a control pedal arrangement is designated generally at 10 and is operative to move a transmission control cable 12 so that upon movement in one direction the transmission is engaged in its forward driving range and when the transmission cable 12 is moved in an opposite direction the transmission is engaged in its rearward driving range. Similarly the control pedal arrangement 10 is operative to move a throttle control cable 14 from the position illustrated in FIG. 1 in which the engine is operating in its idle speed range upwardly to a position in which the engine is operating in its high speed range.

The pedal control assembly 10 includes a right pedal 16 controlling the forward driving range and a left pedal 18 controlling the reverse driving range of the transmission. The pedals 16 and 18 have pedal arms 20 and 22, respectively, provided with bearing members 20a and 22a similarly pivoted on a shaft 24, the opposite ends of which are supported in bosses 26 and 28 joined together in axially aligned relationship by a U-shaped bracket 30. The bracket 30 is adapted to be supported in any conventional manner to a mounting support such as the firewall 32 of the engine compartment of the vehicle.

Each of pedals 16 and 18 are biased in a counterclockwise direction by a pair of spring 34 against a stop 36 fixed to the boss 26 and overlying the pedal links 20 and 22. In this position the pedals 16 and 18 are suspended in elevated position above the floor or platform 38 of the vehicle.

The shaft 24 also pivotally supports a throttle control lever 40. The throttle control lever 40 is disposed between the pedal links 20 and 22 and is provided with a transverse pin 42 which as seen in FIG. 1 is disposed in spaced relationship to the axis of the shaft 24 for engagement by the pedal links 20 and 22 after they have moved a predetermined amount relative to the shaft 24. An end of the throttle control lever 40 remote from the shaft 24 is provided with a pivot pin 44 pivotally connecting the end of the throttle control cable 14 so that pivotal movement of the throttle control lever 40 results in reciprocation of the throttle cable 14.

Figure 3:
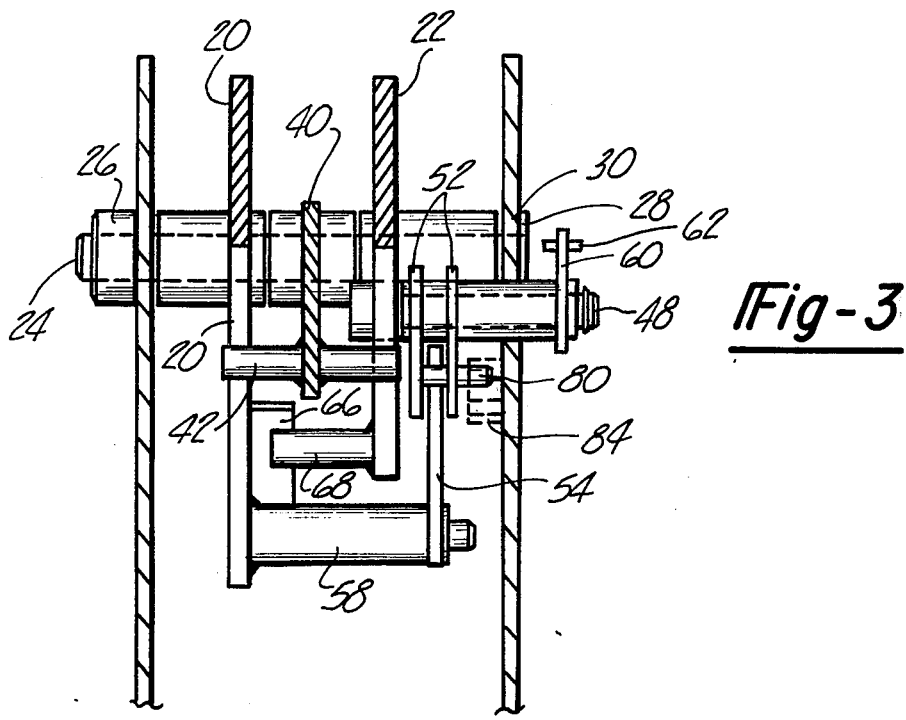
FIG. 3 is an end view of the control pedal arrangement seen in FIG. 1 taken on line 3—3 of FIG. 1.

The left pedal lever 22 carries a transmission control lever assembly 46 which is mounted to pivot on a shaft 48 disposed in parallel spaced relationship to the shaft 24. A tubular member 50 is rotatably supported on the shaft 48 and the tubular member supports a pair of parallel spaced plates 52 which receive a connecting link 54 therebetween. The link 54 is pivotally connected to the plates 52 by means of a pin 56. The other end of the link 54 is pivotally connected to a pivot post 58 rigidly connected to one side of the right pedal lever 20 as best seen in FIG. 3.

The outer end of the tubular member 50 supports one end of a transmission control arm 60, the other end of which is pivotally connected by means of the pin 62 to the transmission control cable 12 so that movement of the arm 16 serves to reciprocate the cable.

The mounting of the transmission lever assembly 46 for pivotal movement on the left pedal lever 22 and its connection through means of the link 54 with the right pedal lever 20 is such that if only the right pedal 16 is depressed to pivot about shaft 24, the transmission control arm 60 is rotated in a clockwise direction about shaft 48 as seen in FIG. 1. This pulls the transmission control cable 12 upwardly to engage the transmission in its forward driving range. Similarly, when only the left pedal 18 is depressed, the relative movement between the pedal levers 20 and 22 causes transmission control arm 60 to swing in a counterclockwise direction to push the transmission control cable 12 downwardly to place the transmission in its reverse driving range.

Approximately 10° of pedal movement is required to fully engage the transmission in either its forward or reverse driving range and the remainder of the pedal movement is used to operate the throttle control cable 14. Upon movement of the right pedal 16 for forward driving movement of the vehicle, the pedal lever 20 comes into engagement with the pin 42 on the throttle control lever so that further movement of the pedal 16 swings the throttle control 40 in a clockwise direction about the shaft 24 to pull the throttle control from its idle range to a higher speed range. Similarly, movement of the left or reverse pedal 18 through a range of approximately ten degrees brings it into engagement with the pin 42 at the opposite side of the throttle control member 40 to swing it in a clockwise direction.

The transmission is fully engaged after approximately 10° of movement of either the right or left pedal so that further movement of the transmission cable is not required. To prevent further movement of the cable when the transmission has been engaged in its forward driving range by movement of the right pedal 16, a stop member 66 on the side of the right pedal lever 20 engages a stop pin 68 extending from the adjacent side of the other pedal lever 22. Upon engagement of stop 66 with stop pin 68, further movement of the right pedal 16 causes simultaneous movement of the left pedal 18. In other words, once the transmission is engaged in its forward range, further movement of the right pedal 16 into the throttle range causes the pedals to move together with the right pedal leading the left pedal by approximately 10°. In a like manner, when the left pedal or reverse pedal 18 is depressed to engage the transmission in its reverse driving range, the pivot post 58 on the right pedal lever 20 is engaged by a recessed stop surface 72 on the left pedal lever 22 so that continued movement of the left or reverse pedal into the throttle control range causes movement of the right pedal lever 20 and the left pedal leads the right by approximately 10°. In this manner the initial movement of either of the pedal levers 20 or 22 causes engagement of the transmission and after the transmission is engaged additional movement acts to move the throttle control member 40.

It will be noted that when both the forward and reverse pedals 16 and 18 are disposed against stop 36 in FIG. 1 the pin 62 connected to the transmission control cable 12 is substantially axially aligned with the shaft 24. As a result, when both the forward and reverse pedals 16 and 18 are depressed simultaneously, there is no change in position of the pin 62 so that both of the pedals may be moved into engagement with the pin 42 to control the throttle without engaging the transmission.

The transmission lever assembly 46 is provided with a stop pin 80 which passes between a pair of spaced guide plates 82 and 84 that are connected to the mounting bracket 30 supporting the pedal assembly 10. Upon movement of both the left and right pedals 16 and 18 as a unit the pin 80 passes between the plates 82 and 84. However, if the right pedal only is depressed, the pin 80 swings upwardly about the shaft 48 and then passes over the top of the guide plate 82 when the right pedal 16 is in its throttle control range. On the other hand if the left pedal is depressed, the initial counterclockwise movement of the transmission lever assembly 46 about the shaft 48 causes the pin 80 to pass under the guide plate 84. Thus the guide plates 82 and 84 prevent any substantial relative movement between the transmission control assembly 46 and the left pedal lever 22 when either of the pedals is in the throttle control range. This prevents changing the transmission condition or driving direction without first allowing the control pedals to return to the engine idle position.

An example of a typical operation is one wherein the vehicle is moved in a forward direction to a loading site, the vehicle is loaded while it remains in a stationary position, and thereafter the vehicle is driven in a reverse direction from the loading site, all of which can be accomplished solely by manipulation of the foot pedals 16 and 18. By depressing the right pedal 16 the pedal lever 20 moves in a clockwise direction as viewed in FIG. 1 causing the transmission control assembly 46 to swing in a clockwise direction relative to the stationary shaft 48 to pull the transmission cable 12 and place the transmission in its forward driving condition. After the first ten degrees of movement, the right pedal lever 20 engages the pin 42 to swing the throttle control member 40 clockwise about shaft 24 to pull cable 14 and increase the engine speed. This causes the vehicle to move forwardly. At the same time the stop 66 on the right pedal assembly comes into engagement with the stop pin 68 so that the right and left pedal move in unison to prevent further movement of the transmission cable 12.

As the vehicle approaches the loading site, release of the right pedal 16 permits return of the throttle control cable 14 to reduce engine speed and as the pedal approaches its original position the transmission becomes disengaged and in its neutral position. Thereafter the operator while manipulating the load lifting controls, not shown, may depress both pedals 16 and 18 simultaneously. Because of the substantially coaxial position of the pin 62 and the shaft 24 there is no movement of the transmission cable 12 and after the pedals 16 and 18 have been moved simultaneously through approximately 10°, the pin 42 is engaged by both pedals to swing the throttle control member 40 to increase engine speed which is employed during the loading operations. After loading is completed release of the right and left pedals returns the engine to an idle speed while the transmission remains in its neutral position. Following this, the left pedal 18 may be depressed which causes the transmission lever assembly 46 to swing in a counterclockwise direction about shaft 48 to push the transmission control cable 12 to place the transmission in its reverse driving condition. Further movement of the left pedal 18 causes simultaneous movement of the right pedal 16 as well as engagement with the pin 42 on the throttle control member 40 for increasing the speed of the engine and speed of movement in the reverse direction.

A simple pedal control arrangement has been provided for controlling both the transmission and throttle of the vehicle so that movement of one pedal initially engages the transmission in one of its driving ranges and subsequent movement increases the engine speed to cause the vehicle to move in the direction of the selected transmission range. Simultaneous movement of both pedals permits the transmission to remain in its neutral position while the engine speed is controlled by movement of the pedals into the throttle control range. The pedals are interconnected so that relative movement of the pedals causes the necessary movement for transmission control and after that control is accomplished the pedals are moved simultaneously with each other to control engine speed. The pedals also are provided with a lock arrangement which precludes changing the direction of transmission drive while the engine is operating above idle speed, that is, in its throttle control or higher speed range.

The embodiments of the invention in which an exclusive property or privilege is claimed are defined as follows:

1. A control pedal and linkage arrangement comprising; first and second pedal levers mounted for pivotal movement, a transmission control means supported for pivotal movement in one direction upon movement of one pedal lever and in another direction upon movement of the other pedal lever, said transmission control means being adapted for connection to a transmission for movement in opposite directions from a neutral position into a forward and reverse driving range, said transmission control means being movable in a first range upon movement of either one of said pedal levers and remaining in a stationary position upon simultaneous movement of both of said pedal levers, a throttle control member adapted for connection to the controls of an engine and being movable to increase speed, said throttle control member being movable upon movement of either or both of said first and second pedal levers beyond said first range and into a second range.

2. The combination of claim 1 wherein said first and second pedal levers are mounted for pivotal movement about a common axis.

3. The combination of claim 2 in which said throttle control member is supported for pivotal movement about said common axis.

4. The combination of claim 2 and wherein said transmission control means is supported for pivotal movement on one of said pedal levers, and link means connecting said transmission control means to the other of said pedal levers.

5. The combination of claim 4 in which said transmission control means is connected to a transmission control about a point substantially coaxial with said common axis for preventing movement of said point relative to said transmission control lever upon simultaneous movement of said first and second pedal levers in the first range.

6. The combination of claim 1 and further comprising complementary stop means on said pedal levers permitting movement of a selected pedal in a first range independently of the other pedal lever and being engagable with each other to move as a unit in the second range.

7. The combination of claim 1 and further comprising safety lock means operatively associated with said transmission control lever and preventing relative movement of said first and second pedal levers when one pedal is in said second range.

8. The combination of claim 7 in which said safety lock means includes guide means mounted in fixed position relative to said axis and a lock member on said transmission control means movable into locking relation with said guide means upon movement of either or both of said pedal levers.

9. The combination of claim 8 in which said guide means includes a pair of spaced apart plate members and in which the lock member is movable between said plate members upon simultaneous movement of said pedal levers, is movable to one side of both of said guide members upon movement of one of said pedals and is movable to the other side of both of said plate members upon movement of the other pedal lever.

10. A pedal control for a vehicle comprising; a first pedal mounted on said vehicle for pivotal movement in a first range between a position corresponding to a neutral position and forward driving position, a second pedal mounted on said vehicle for pivotal movement in a first range between a neutral position and a reverse driving position, means supported on one of said pedals and connected to the other of said pedals and further connecting said first and second pedals to a transmission, a throttle control member supported for pivotal movement in a throttle control range between an engine idle position and a high speed position, said throttle control lever being engageable by first and second pedals after movement in their first range for movement of said pedals in a second range together with the throttle control lever, and stop means on each of said pedals engageable with the other of said pedals which upon movement of either one of said pedals to its second position causes subsequent movement of both of said pedals as a unit.

* * * * *

Disclaimer 4,129,047.—*Arthur E. Dornan*, Ypsilanti,Mich. CONTROL ARRANGEMENT. Patent dated Dec. 12, 1978. Disclaimer filed Oct. 29, 1982, by the assignee, *Massey-Ferguson Inc.*

Hereby enters this disclaimer to claims 1, 2, 7, 8 and 9 of said patent.

[*Official Gazette December 14, 1982.*]